US011064104B2

(12) United States Patent
Eramian

(10) Patent No.: US 11,064,104 B2
(45) Date of Patent: Jul. 13, 2021

(54) SYNCHRONIZED MEDIA CAPTURING FOR AN INTERACTIVE SCENE

(71) Applicant: eBay Inc., San Jose, CA (US)

(72) Inventor: David Edward Eramian, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/411,595

(22) Filed: May 14, 2019

(65) Prior Publication Data

US 2019/0268529 A1    Aug. 29, 2019

Related U.S. Application Data

(63) Continuation of application No. 14/302,597, filed on Jun. 12, 2014, now Pat. No. 10,306,128.

(51) Int. Cl.
*H04N 5/232* (2006.01)
*H04N 5/247* (2006.01)

(52) U.S. Cl.
CPC ..... *H04N 5/23206* (2013.01); *H04N 5/23293* (2013.01); *H04N 5/232933* (2018.08); *H04N 5/247* (2013.01)

(58) Field of Classification Search
None
See application file for complete search history.

(56) References Cited

U.S. PATENT DOCUMENTS

| 7,859,571 | B1 * | 12/2010 | Brown | G08B 13/19645 |
| | | | | 348/211.3 |
| 7,920,849 | B2 * | 4/2011 | Pop | H04W 4/029 |
| | | | | 455/414.1 |
| 10,306,128 | B2 | 5/2019 | Eramian | |
| 2002/0171734 | A1 | 11/2002 | Arakawa et al. | |
| 2003/0126039 | A1 | 7/2003 | Kiyose et al. | |
| 2004/0032495 | A1 | 2/2004 | Ortiz | |
| 2004/0263609 | A1 | 12/2004 | Otsuki et al. | |
| 2006/0001744 | A1 * | 1/2006 | Singh | H04N 5/23206 |
| | | | | 348/207.99 |

(Continued)

OTHER PUBLICATIONS

Non-Final Office Action received for U.S. Appl. No. 14/302,597, dated Feb. 7, 2017, 23 pgs.

(Continued)

*Primary Examiner* — Peter D Le
(74) *Attorney, Agent, or Firm* — Schwegman Lundberg & Woessner, P.A.

(57) ABSTRACT

There are provided systems and methods for synchronized media capturing for an interactive scene. A user at a venue may watch an event unfold at the venue. The venue may include wireless beacons established throughout the venue. The wireless beacons may be configured to establish short range wireless communications with the user's device. Once a connection is established, the wireless beacons may instruct the user's device to capture media of an instance during the event. The wireless beacons may similar instruct other user's devices to capture media of the instance at the same time, thereby synchronizing media capturing of a particular instance during the event. The user may review the media and select to delete the media or upload the media to a media sharing service. The server may further process the media into an interactive scene.

20 Claims, 5 Drawing Sheets

(56) References Cited

U.S. PATENT DOCUMENTS

| | | | |
|---|---|---|---|
| 2007/0129012 A1 | 6/2007 | Snow | |
| 2009/0017798 A1 | 1/2009 | Pop | |
| 2010/0002071 A1* | 1/2010 | Ahiska | H04N 5/217 348/36 |
| 2010/0141762 A1 | 6/2010 | Siann et al. | |
| 2010/0208068 A1 | 8/2010 | Elsemore | |
| 2010/0266125 A1 | 10/2010 | Tanaka | |
| 2011/0234855 A1* | 9/2011 | Matsumoto | H04N 5/23238 348/231.99 |
| 2013/0010138 A1* | 1/2013 | Bigioi | H04N 5/23219 348/208.2 |
| 2013/0128052 A1 | 5/2013 | Catrein et al. | |
| 2014/0168358 A1* | 6/2014 | Gong | H04N 5/23222 348/39 |
| 2015/0365582 A1 | 12/2015 | Eramian | |

OTHER PUBLICATIONS

Response to Non-Final Office Action filed May 8, 2017, for U.S. Appl. No. 14/302,597, 10 pgs.

Final Office Action received for U.S. Appl. No. 14/302,597, dated Aug. 9, 2017, 26 pgs.

Response to Final Office Action filed Oct. 27, 2017, for U.S. Appl. No. 14/302,597, 13 pgs.

Advisory Action received for U.S. Appl. No. 14/302,597, dated Nov. 9, 2017, 3 pgs.

Non-Final Office Action received for U.S. Appl. No. 14/302,597, dated Mar. 9, 2018, 26 pgs.

Applicant Initiated Interview Summary received for U.S. Appl. No. 14/302,597, dated Apr. 16, 2018, pp. 3.

Response to Non-Final Office Action filed Jun. 11, 2018, for U.S. Appl. No. 14/302,597, 11 pgs.

Final Office Action received for U.S. Appl. No. 14/302,597, dated Jul. 17, 2018, 25 pgs.

Response to Final Office Action filed Oct. 8, 2018, for U.S. Appl. No. 14/302,597, 11 pgs.

Advisory Action received for U.S. Appl. No. 14/302,597, dated Oct. 19, 2018, 3 pgs.

Response to Advisory Action filed Nov. 19, 2018, for U.S. Appl. No. 14/302,597, 11 pgs.

Notice of Allowance received for U.S. Appl. No. 14/302,597, dated Jan. 11, 2019, 14 pgs.

* cited by examiner

SYNCHRONIZED MEDIA CAPTURING FOR AN INTERACTIVE SCENE

CROSS-REFERENCE TO RELATED APPLICATIONS

This application is a continuation of U.S. patent application Ser. No. 14/302,597, filed on Jun. 12, 2014; the disclosure of which is incorporated herein by reference in its entirety.

TECHNICAL FIELD

The present application generally relates to synchronized media capturing for an interactive scene and more specifically to utilizing wireless beacons at a location where an event is occurring to issue a command to multiple users' device cameras at the scene that synchronizes the cameras to capture media of the event from different perspectives.

BACKGROUND

Users may attend events, such as sporting games, concerts, live performances, or other organized events. At these events, these users may bring user devices, such as mobile phones, tablet computers, and digital cameras. The users may utilize these user devices to capture images during the events, such as when an artist comes on stage to perform a song, an exciting play occurs within a sports game, etc. With the prevalence of social media and social networking services, these users may upload the images they capture to a service, which may then share the images with friends and family the user has added to their network. However, images of these instances in the event may be taken at different times and aimed at different parts of the venue. Thus, other users viewing the images online may not view a complete picture of a particularly exciting instance during the event. Further, users who attend the event usually may only access images they captured and images that their friends and family captured at the event. Thus, the user may be prevented from viewing other perspectives of the image or a more interactive scene of the event.

Figure 1:
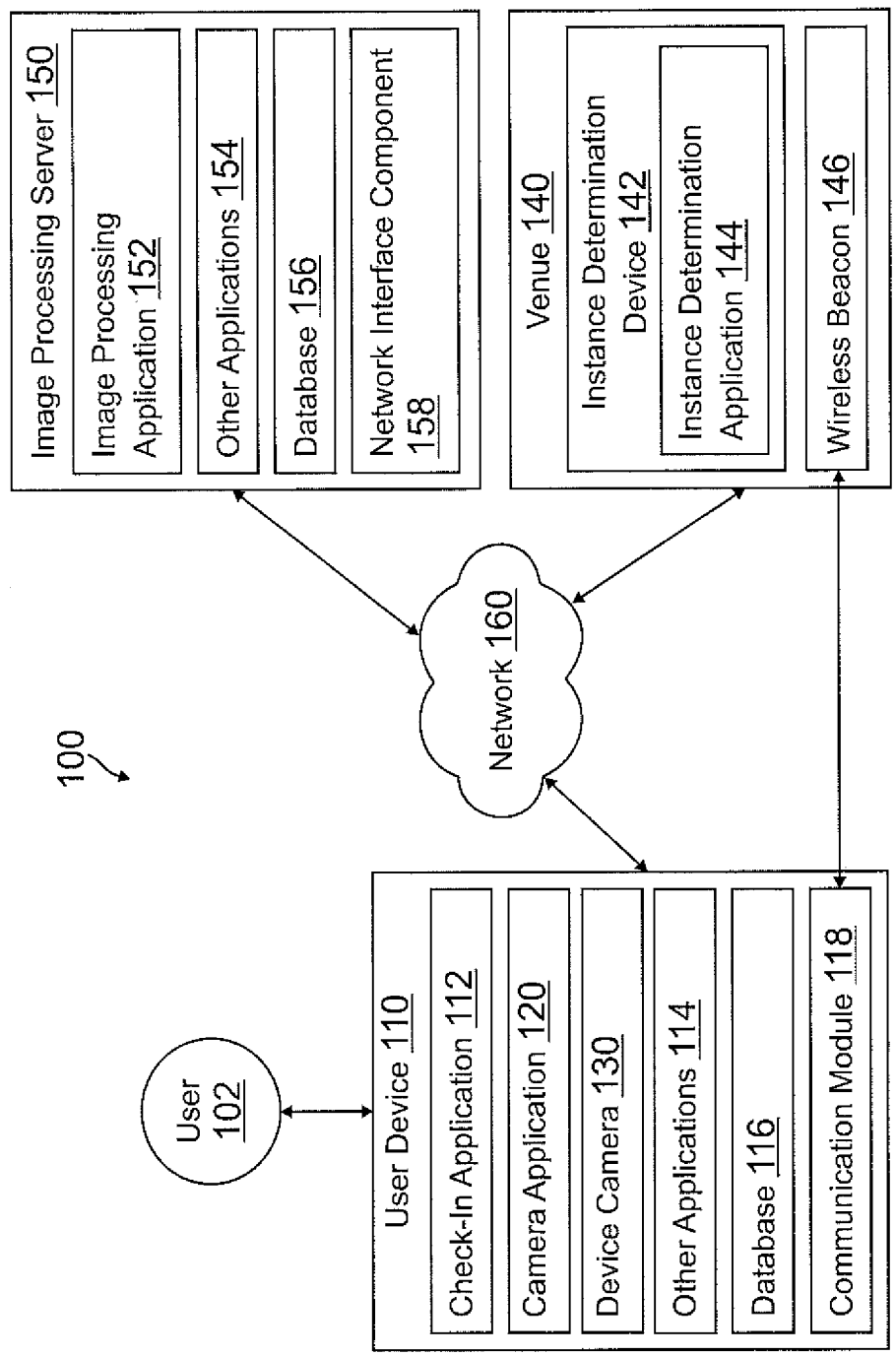
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide synchronized image capturing for an interactive scene. Systems suitable for practicing methods of the present disclosure are also provided.

Various locations may provide short range wireless communications with a device, such as through WiFi, Bluetooth Low Energy (BLE), LTE Direct, or other communication protocol. These beacons may be set up at a location and communicate with devices to alert users of check-in services through their device. The beacons may provide additional functionality, such as establishing a connection with a device and/or server to engage in transactions, complete communications, and execute processes. The beacons may provide communications to the devices directly, including information stored in the beacons. The beacons may also provide communication with a device at a venue and/or a server of a service provider for that venue.

A location for an event (e.g., a venue hosting a sports game, concert, etc.) may offer check-in services to users utilizing wireless beacons throughout the location. These short range wireless beacons at the location may be configured to communicate with a device for the users at the location. For example, the short range wireless beacon may be established throughout grandstands, seating areas, concession areas, dance floors, entryways, etc., at the location. The beacons may employ BLE, LTE Direct, etc., communications that emit a signal receivable by the devices of the users. The communication may include an identifier for the beacon, the user, the venue's devices/services, and/or a service provider for the venue.

The devices for the users may be set up to passively monitor for communications from the beacons. When a device detects the signal and verifies the one or more identifiers from a beacon, both the device and the beacon may ramp up in power and establish a connection, where the connection may further enable the device to communicate with the beacon, the venue's devices/servers, and/or the service provider. The beacon may be connected to a networked device at the location, or the beacon may include network functionality to communicate with other devices and/or servers. Thus, the beacon enables the user's device to establish a connection, communicate check-in information (e.g., an identifier for the user), and/or initiate a check-in with the location and the specific beacon initiating the connection. The check-in may be completed automatically when the user's device is in range of the beacon, or may be completed after prompting the user to check-in when the user's device is in range of the beacon.

The location for the event may establish a plurality of wireless beacons throughout the location, as previously discussed. The wireless beacons may further be connected to a device or server (e.g., a venues server or a service provider for the venue). The device or server for the location may determine when an instance in the event occurs or is going to occur (e.g., when a play occurs or is about to occur in a sports game, when a musician comes on stage or is about it come on stage in a concert, etc.). The device or server may determine the upcoming or current occurrence of the instance based on devices in connection with the device/server, such as cameras, microphones, etc., or if the instance is planned, may receive previous input for a time of the instance. In addition to the timing of the instance, the device/server may determine a location, orientation, coordinates, or other direction parameter for where the instance is taking place or will take place.

Based on determining an instance in the event, the device/server may instruct the wireless beacons to issue a request or command to user devices held by the audience in proximity to each of the wireless beacons. This request or command may correspond to a request or command to capture an image of the instance when the instance occurs. Thus, the user devices for the audience members may be synchronized to capture images of the instance at the same time using the wireless beacons. In addition to the request/command, the wireless beacons may instruction the audience members where to point or direct a camera of the user devices. The instruction may include directional information that assists the user in aiming the camera. Additionally, the request/command may prevent the camera from being used prior to the instance. For example, concerts, sports games, etc., may prevent photography and/or flash photography up to a certain point during the event. Thus, the request/command may prevent camera usage prior to the instance, where occurrence of the instance causes an image to be captured and enables use of the camera again. If the instance does not occur after a period of time the user devices may again capture images. However, the user device cameras may also be prevented from capturing images after the instance or even if the instance does not occur if photography is prevented during the event except for at a predetermined instance. Although it is presently discussed that the request/command may be to capture an image of the instance, the request/command may correspond to a request/command to capture any media, including video, audio, and audiovisual media.

Once the image of the event is captured, the image may be displayed to the audience member having the user device. The audience member may then choose to upload the image to a service provider or delete the image. If the audience member uploads the image to the service provider, the service provider may utilize the image with other images of the same instance to generate an interactive scene of the instance during the event. The interactive scene may enable users (e.g., the audience members, friends, family, or other people in the event or producing the event) to view the instance in the event through multiple perspectives, The users may scroll through multiple images captured of the instance from the multiple perspectives, In further embodiments, an interactive scene may be built that allows the users to pan, rotate, zoom, and change a view of the instance. Moreover, the service provider may offer sales of the interactive scene or images of the instance to the users.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, a venue 140, and image processing server 150 in communication over a network 160. User 102, such as an audience member, fan, or other viewer of an event, may arrive at venue 140 to watch the event with user device 110. Venue 140 includes wireless beacons 146 established throughout venue 140 and configured to connect to user device 110. Once user device 110 establishes a connection with one or more of wireless beacons 146 at venue 140, the one or more wireless beacons 146 may then instruct user 102 to point a device camera 130 of user device 110 at an instance occurring in the event and send a command to user device 110 to capture an image of the instance. The image may then be transmitted to image processing server 150 for processing and incorporation in an interactive scene.

User device 110, wireless beacons 146, and image processing server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication with wireless beacons 146 and/or image processing server 150. For example, in one embodiment, user device 110 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a check-in application 112, a camera application 120, a device camera 130, other applications 114, a database 116, and a communication module 118. Check-in application 112, camera application 120, and other applications 114 may correspond to processes, procedures, and/or applications executable by a hardware processor, for example, a software program. In other embodiments, user device 110 may include additional or different software as required.

Check-in application 112 may be used by user 102 of user device 110 to establish a connection with one or more of wireless beacons 146, including a check-in with venue 140. Check-in application 112 may correspond to a specific application utilized by user device 110 with venue 140 to complete a check-in for venue 140. The check-in with venue 140 may correspond to a process to log in to a user account of user 102 with venue 140 (or image processing server 150 if image processing server 150 provides check-in services). In other embodiments, the check-in may provide and/or verify the identity of user 102, including transmission of an identifier for user 102 and/or user device 110. The check-in may be completed over network 160 with venue 140. In such embodiments, check-in application 112 may correspond more generally to a browser application configured to communicate with venue 140.

Check-in application 112 may also receive short range wireless communications from wireless beacons 146 at a location for one or more of wireless beacons 146 and transmit information to wireless beacons 146, including check-in information for a check-in process with venue 140 (or image processing server 150 if image processing server 150 provides check-in services) that associates user 102 with the location corresponding to the one or more of wireless beacons 146 transmitting the short range wireless communications. For example, the location for one of wireless beacons 146 may correspond to a seating, concession areas, grandstands, theater/amphitheater locations, etc., in venue 140. In such an example, wireless beacons 146 may be range limited to correspond only to an area around the location for the one of wireless beacons Wireless beacons 146 may be set to be range limited through signal strength of wireless beacons 146, or may be limited by virtue of walls, pillars, radiation absorbent materials, or other signal interferences of venue 140. In response to a received identifier from one or more of wireless beacons 146, check-in application 112 may transmit information to one or more of wireless beacons 146 when user 102 is nearby the one or more of wireless beacons 146 (e.g., sitting in area G, mezzanine of a concert hall) enabling venue 140 to determine the position of user 102 within venue 140 through wireless beacons 146. Once check-in application 112 has connected to one or more of wireless beacons 146, check-in application 146 may begin transmitting information between user device 110 and the connected beacons of wireless beacons 146.

Check-in application 112 may execute in the background of an operating system of user device 110 and be configured to establish connections, using communication module 118 of user device 110, with one or more of wireless beacons. The connection may be established with or without user input from user 102. For example, wireless beacons 146 may broadcast a token, such as a universally unique identifier (UUID), for reception by check-in application 112, as will be explained in more detail herein. Check-in application 112 may utilize communication module 118 of user device 110 to receive the token from one or more of wireless beacons 146. If check-in application 112 acknowledges the UUID as identifying wireless beacons 146, venue 140, and/or image processing server 150 (e.g., if check-in application 112 determines the UUID corresponds to a request to complete a check-in), check-in application 112 may transmit an identifier corresponding to user 102 and/or user device 110 back to the one or more of wireless beacons 146 transmitting the UUID.

Check-in application 112 may utilize communication module 118 of user device 110 to communicate with wireless beacons 146 (e.g., over near field communication, Bluetooth, Bluetooth Low Energy, radio, infrared, LTE Direct, or other connection). The identifier from user device 110 may include, be transmitted with, concatenated with, or otherwise bundled with the identifier received from wireless beacons 146. In other embodiments, additional or different information may be transmitted to wireless beacons 146, such as a name or other personal information for user 102, and/or information for an account, event ticket, image tracking number, etc. Moreover, the information transmitted to wireless beacons 146 does not need to be utilized to process and/or complete a check-in in all embodiments.

Once a connection is established with wireless beacons 146, user device 110 may be checked-in with venue 140 if user 102 has not previously been checked-in. The check-in process may also associate user 102 with the one or more of wireless beacons 146 used to connect to user device 110. For example, venue 140 may previously have registered wireless beacons 146 as located in a specific area of venue 140 (e.g., grandstands, theater/amphitheater seating, etc.). Thus, venue 140 is informed that user 102 is at the specific area because user device 110 connects to the one or more wireless beacons 146 for that area. As previously discussed, in other embodiments, a check-in need not be processed and/or completed to associate user 102 with the area. Thus, other connections and data transfers to the one or more wireless beacons 146 at the specific area may be sufficient to associate user 102 with the specific area.

Once connected to one or more of wireless beacons 146, check-in application 112 may send and receive information with the connected one or more of wireless beacons 146. Information received from a connected beacon of wireless beacons 146 may include a request/command to capture an instance during an event happening at venue 140. For example, an event may correspond to a baseball game, concert, speech, etc. Thus, an instance during the event may correspond to a homerun hit, a song or solo by a musician, or an impactful statement during the speech, respectively. Venue 140 and/or image processing server 150 may determine when the instance occurs or when an instance is going to occur, as will be explained in more detail herein. Once that determination is made, one or more of wireless beacons 146 may issue the request/command to user device 110. Check-in application 112 may receive the request/command and may instruct camera application 120 accordingly.

The request/command may also include prevent camera application 120 and device camera 130 from capturing images prior to the occurrence of the instance. Thus, check-in application 112 may also issue an instruction to prevent the use of camera application 120 and device camera 130 prior to the instance. Check-in application 112 may release camera application 120 and device camera 130 to begin capturing images again once the instance has occurred, if sufficient time has occurred for the instance to pass, or based on a time limit set by venue 140 and/or image processing server 150 (e.g., if the instance does not occur and after a period of time, thereby insuring camera application 120 and device camera 130 does not remain locked). Thus, check-in application 112 may enable image and video photography to again occur on user device 110 even if the instance does not occur.

The prevention may insure that camera application 120 and device camera 130 are available for capturing the image of the instance at the same moment as other devices/camera at venue 140, thereby only preventing camera application 120 and device camera 130 for capturing images for a small time frame prior to the instance. However, other embodiments may require the prevention to be issued well before the instance, such as in the case of a dark exhibit, concert hall, during a pivotal sports play or action, etc. Thus, in such embodiments, the command/request to capture the image may occur at some time prior to the instance when photography of the event should discontinue and prevent capturing of images up until the instance occurs during the event.

The request/command received by check-in application 112 may be issued in one, two, or more steps. For example, in a two-step approach, check-in application 112 may receive a first request to capture an image of an upcoming instance. The request may notify user 102 that an instance during an event for capturing an image is upcoming and give user 102 instructions on where and how to orient device camera 130 to capture the image of the instance. The instruction may be displayed through check-in application 112 or through camera application 120, including directional instructions, compass/navigational instructions, or visual instructions in a display interface of camera application 120, as will be explained in more detail herein. If user 102 chooses to capture the image using the instructions, when the instance occurs, check-in application 112 may receive a command from one or more of wireless beacons 146 to capture the image. The command may be issued by wireless beacons 146 simultaneously to all devices following the instructions to capture the image. Thus, the command may enable synchronized images/photography of an event. In other embodiments, the request may include a countdown timer until the instance, thereby removing the need to have a command sent by wireless beacons 146. Additionally, other requests/commands may utilize more than two steps, such as an initial request, a first command to capture a first image, a second command to capture a second image, etc. Other embodiments may utilize further requests/commands to update an initial request/command based on a new timer, time frame, and/or instance.

In other embodiments, wireless beacons 146 may issue a single command, as will be explained in more detail herein. Thus, check-in application 112 may receive a single command to capture an image of an instance during an event. The command may occur at some time preceding the instance or at the time of occurrence of the instance. The command may instead instruct camera application 120 and device camera 130 to capture an image of the instance. The command may also include additional parameters, processes, or information, which may execute the command only if camera application 120 and device camera 130 are oriented to capture the image of the instance. Thus, the command may utilize a map, compass, accelerometer, or other functions and devices of user device 110 to determine if device camera 130 can capture the image. Therefore, if user 102 has pointed device camera 130 at the event to capture images, the command may capture an image of the instance. Conversely, if user 102 has placed user device 110 away (e.g., in a pocket or case), the command may have no effect. Additionally, the request/command may include a request/command to capture a single image, a plurality of images including a plurality of images at predetermined intervals, a sound recording, and/or a video recording.

Camera application 120 may be configured to provide an application to capture images using a device camera of user device 110, such as device camera 130. Camera application 120 may provide additionally processing after capturing an image, including cropping, adjusting color/saturation/resolution, or other editing procedures. Camera application 120 may utilize functions associated with device camera 130, such as flash, zoom, image resolution, or other camera parameter. Additionally, camera application 120 may provide for creating, accessing, and editing a library of images, such as a photo library of captured images stored in database 116. The library and/or individual images may be accessible by one or more other applications through an API of camera application 120. Images captured by device camera 130 may correspond to still images and/or video images.

As previously discussed, camera application 120 may receive requests/commands to capture images from check-in application 112. Camera application 120 may therefore process the requests/commands and capture an image of an instance. Additionally, the requests/commands may lock and unlock camera application 120, as previously discussed. Once the request/command is received, camera application 120 may display instructions to user 102 if the instructions are included in the command/request. The instruction may include word, directional, or visual instructions. Directional instruction may include areas/locations in venue 140, cardinal directions, up/down/right/left direction, camera tilt, etc. Visual instructions displayed to user 102 in camera application 120 may include points, dots, circles, boxes, and/or highlights of certain areas, people, things, or other area in the image.

Although for purposes of clarity the requests/commands are discussed and issuing a request/command to capture an image of the instance, in other embodiments, different media may be captured by the request/command. For example, media may comprise still images, audio recordings, video records, and/or other audiovisual media recordings. Thus, a request/command to capture media of the instance may comprise a request/command to capture a still image, an audio recording, a video recording, or other audiovisual data and/or information of the instance during the event. Additionally, the request/command may comprise a request/command to generally capture media (e.g., a media types chosen by user 102) or capture a plurality of media types (e.g., a still image and a video recording).

The image may be displayed to user 102 after the image is captured. User 102 may then choose to upload the image to image processing server 150, save the image locally to database 116, or delete the image. If user 102 chooses to upload the image to image processing server 150, the image may be utilized to construct an interactive scene of the instance during the event at venue 140, as will be explained in more detail herein. User 102 may utilize camera application 120 or a browser application of user device 110 to view and/or navigate the interactive scene.

Device camera 130 corresponds to an optical device of user device 110 enabling user 102 to record images, including still and/or video images. Device camera 130 may correspond to a digital camera on a user device, or may more generally correspond to any device capable of recording an image. Device camera 130 may include various features, such as zoom, flash, focus correction, shutter speed controls, or other various features usable to capture one or more images. Device camera 130 may further display a preview and/or captured image to user 102 through another device of user device 110, such as a viewfinder, screen (e.g., mobile phone screen), display interface of camera application 120, or other display. User 102 may utilize device camera 130 with camera application 120 to record still images and/or video images.

In various embodiments, one or more features of check-in application 112 and/or camera application 120 may be incorporated in the same application so as to provide their respective features in one application.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking, online payments, money transfer, or other applications associated with image processing server 150. Other applications 114 may include browser, social networking, mapping, navigational, compass, etc., applications standard to a mobile phone, tablet computer, wearable computing device, and/or personal computer, which may also be used in conjunction with check-in application 112 and/or camera application 120. Other applications 114 may contain software programs, executable by a processor, including a graphical user interface (GUI) configured to provide an interface to the user.

User device 110 may further include database 116 which may include, for example, identifiers such as operating system registry entries, cookies associated with check-in application 112, camera application 120, and/or other applications 114, identifiers associated with hardware of user device 110, or other appropriate identifiers, such as identifiers used for payment/user/device authentication or identification. Identifiers in database 116 may be used by a service provider, such as image processing server 150, to associate user device 110 with a particular account maintained by the service provider or identify user 102 and/or user device 110 with image data submitted by user device 110. Database 116 may include tokens and/or encryption keys, such as an encryption key corresponding to one or more of wireless beacons 146, venue 140 (or devices/servers for venue 140), and/or image processing server 150. Database 116 may include identifying information for tokens enabling check-in application 112 to identify wireless beacons 146, venue 140 (or devices/servers for venue 140), and/or image processing server 150 when receiving a corresponding check-in token.

Requests/command to capture an image of an instance during an event at venue 140 may be stored or written to database 116 as necessary. For example, the request/command may correspond to a future instance, where the request/command is stored with accompanying data until the instance occurs. The accompanying data may include a countdown to the instance, directional information for device camera 130, or other necessary data including lockout data/commands for camera application 120 and device camera 130. Database 116 may further store images captured by device camera 130, Images in database 116 may include images for use by image processing server 150 to create an interactive scene. Thus, user device 110 may transmit images in database 116 to image processing server 150.

User device 110 includes at least one communication module 118 adapted to communicate with wireless beacons 146 and/or image processing server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacons 146 using short range communications, such as Bluetooth Low Energy, LTE Direct, radio frequency, infrared, Bluetooth, WiFi, and near field communications.

Venue 140 may correspond to a physical location hosting or displaying an event viewed by user 102. Venue 140 may correspond to a stadium, center (e.g., sports/convention center), theater/amphitheater, park, or other location with an event may be offered to user 102. An event at venue 140 may correspond to sports games, plays, speeches, theater, or other planned occasion. Venue 140 may include infrastructure for determining if and when an instance may occur during the event and establishing a connection or check-in with user device 110. For example, venue 140 may include wireless beacons, computer systems including processing and memory units, communication modules, and/or other necessary infrastructure. Thus, venue 140 of FIG. 1 contains an instance determination device 142 executing an instance determination application 144 and wireless beacons 146. In other embodiments, venue 140 may include additional or different hardware and infrastructure as required.

Instance determination device 142 may be implemented using any appropriate hardware and software configured for wired and/or wireless communication with wireless beacons 146 and/or image processing server 150. For example, instance determination device 142 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Instance determination device 142 may further have connected devices configured to receive input from an ongoing event or administrator of an event. Such devices may include keyboards/mice, attached PC, tablet, or mobile phone computing devices, cameras, and/or microphones all configured to receive information. The information may be utilized by instance determination application 144 to determine an instance occurring during an event. Although a hardware device is shown, the device may be managed or controlled by any suitable processing device. Although only one device is shown, a plurality of devices may function similarly. Moreover, in various embodiments, one or more of the applications, processes, and/or features discussed below in reference to instance determination device 142 may be included in image processing server 150, and vice versa.

Instance determination device 142 of FIG. 1 executes instance determination application 144. Instance determination application 144 may correspond to processes, procedures, and/or applications executable by a hardware processor, for example, a software program. In other embodiments, instance determination device 142 may include additional or different software as required.

Instance determination application 144 may be configured to determine if and when an instance during an event may occur. Thus, instance determination application 144 may be configured to receive and collect input from instance determination device 142 and process the input. As previously discussed, the input may correspond to direct input from an administrator of an event, such as a director of a play, announcer of a sports game, etc., and thus note a time and location within venue 140 for the instance. In such embodiments, the input may correspond to text/data input from the administrator.

In other embodiments, instance determination application 144 may receive other input, such as data input from cameras, microphones, or other input/output devices of instance determination device 142. Such input may determine an upcoming instance to occur or the present occurrence of an instance. For example, a camera may be utilized to determine if a player or musician has left the event and that the next player or musician is soon to arrive. Thus, instance determination application 144 may determine an instance is about to occur. In other embodiments, the camera or a microphone may detect a play in a sports game has occurred or a musician is playing a specific song. Thus, instance determination application 144 may determine an instance is presently occurring in the event at venue 140.

Instance determination application 144 may process the input and generate a request/command to capture an image that is distributed to user device 110 using wireless beacons 146. As previously discussed, the request/command may include a two part/phase initiation or only a single command to capture the image. For example, if instance determination application 144 determines an instance is going to occur and knows the exact or approximate time until the instance occurs, instance determination application 144 may issue a request to capture an image of the instance to wireless beacons 146 for distribution to user device 110. The request may activate at the end of the time period and capture or attempt to capture the image. In certain embodiments, the request may only activate if certain parameters are met, such as an orientation of device camera 130. However, in other embodiments, instance determination application 144 may not know the exact timing of the future instance and thus utilize wireless beacons 146 to capture an image of the instance when the instance occurs using a second command, as determined by instance determination device 142. Furthermore, instance determination application 144 may receive input of the present occurrence of an instance and issue a command for distribution by wireless beacons 146 to capture the image of the instance. In both embodiments, the command may capture or attempt to capture the image, or may only capture the image if parameters are met, such as the orientation of device camera 130.

Instance determination device 142 may include a check-in application, which may correspond to processes to complete check-in with user device 110 for venue 140 (e.g., with one or more of wireless beacons 146 established at venue 140). Thus, the check-in application may correspond to an application configured to receive check-in information from user device 110 and complete the check-in. The check-in request may include log in information for a user account with venue 140 and/or image processing server 150 and thus complete the check-in with user 102 by verifying the account information. For example, the check-in information may include an identifier or other account information for a user account of user 102. However, in embodiments where a user account has not been previously established by user 102, the check-in application may receive other information identifying user 102 and/or user device 110, including a user name/identifier, user device identifier, an identifier for an account with another server, or other information. In various embodiments, the check-in information does not need to be utilized to complete a check-in and may be utilized by wireless beacons 146 to transmit a request/command to capture an image of an instance during an event at venue 140.

Wireless beacons 146 may be maintained, for example, by venue 140 and/or image processing server 150. Wireless beacons 146 may be implemented using any appropriate hardware and software configured for wireless communication with user device 110. For example, in one embodiment, one or more of wireless beacons 146 may be implemented as a dongle device including a hardware processor and a communication module, for example, connected to device at venue 140 (e.g., instance determination device 142). Wireless beacons 146 may also be implemented as devices incorporated within a personal computer (PC), a smart phone, laptop computer, and/or other types of computing devices capable of transmitting and/or receiving data, such as an IPAD® from APPLE®. Wireless beacons 146 may also act as stand-alone devices including a processor, communication module, and/or network interface component configured to communicate with user device 110 and/or instance determination device 142. Although wireless beacons 146 are described as a plurality of wireless beacons set up throughout venue 140, in various embodiments, wireless beacons 146 may correspond to a single wireless beacon established at venue 140.

Each of wireless beacons 146 may be established in a specific spot in venue 140, such as various seating areas, parts of grandstands, etc. For example, one of wireless beacons 146 may be established on a bottom floor level of a theater, another in a mezzanine area, and another on a top floor. Wireless beacons 146 of FIG. 1 contains processes, procedures, and/or applications executable by a hardware processor, for example, a software program, configured to interact with user device 110 and/or instance determination device 142. Thus, regardless of the implementation of wireless beacons 146 as discussed above, each of wireless beacons 146 may utilize a check-in process and include or be connected to a communication module. In other embodiments, wireless beacons 146 may include additional or different software and devices as required.

Each of wireless beacons 146 may include an application for transmitting requests to establish a connection between a device (e.g., user device 110) and one of wireless beacons 146. The requests may be unique to each of wireless beacons 146 and form a connection with only the matching one of wireless beacons 146. In other embodiments, the request may be unique to a subset of wireless beacons 146 or shared by all of wireless beacons 146. Thus, wireless beacons 146 may utilize short range wireless communications of wireless beacons 146 to transmit the requests to establish a connection, including an identifier such as a Universally Unique Identifier (UUID). If user device 110 receives a request to establish the connection with wireless beacons 146 and responds with an identifier for user 102/user device 110 (potentially including the UUID and other information necessary to effectuate a check-in for user 102), wireless beacons 146 to ramp up in power and create a connection between user device 110 and one of wireless beacons 146.

Each of wireless beacons 146 may uniquely transmit the request to establish the connection with wireless beacons 146 as a short range wireless communication (e.g. a BLE protocol communication) including a "wake up" process for check-in application 112 of user device 110 and/or a token for the one of wireless beacons 146 transmitting the request. In other embodiments, the request and/or connection may utilize near field communication, radio communication, infrared communication, or Bluetooth communication, Additionally, although wireless beacons 146 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacons 146 (e.g, user device 110 and/or venue 140) and establishment of a connection for data transfers.

The request may be specific to user device 110 by including information that is specific to user 102, such as a name, identifier, or user device identifier, The information specific to user 102 may be determined from a user account of user 102 or other information previously provided to venue 140 (or instance determination device 142) and/or image processing server 150. Thus, in certain embodiments, only user device 110 will pick up and authenticate the request. In other embodiments, user device 110 may only pick up the request based on the signal range and/or physical context for one of wireless beacons 146 transmitting the request. For example, one of wireless beacons 146 established at an ordering intercom may be limited in range only to the first floor, mezzanine, top floor, infield/outfield seats, goal line/50 yard line seats, etc.

After one of wireless beacons 146 receives an identifier from user device 110, the one of wireless beacons 146 may determine user 102 is in proximity to itself. The beacon of wireless beacons 146 forming the connection with user device 110 may keep the connection open between user device 110 and the beacon, may transmit the identifier to instance determination device 142 and/or image processing server 150, or may close the connection. However, one wireless beacons 146 receive a request/command to capture an image of an instance during an event at venue 140, wireless beacons 146 may utilize the identifier and/or connection with user device 110 to transmit the request/command to user device 110. In certain embodiments, wireless beacons 146 may receive information from user device 110, including an opt out feature to prevent future requests/commands from instance determination device 142 as well as images captured by user device 110 from a request/command issued by wireless beacons 146. Wireless beacons 146 may also transmit further information to user device 110, including information to prevent camera application 120 and/or device camera 130 from operating, even if user device 110 requests to opt out from the image capturing service of instance determination device 142.

Each of wireless beacons 146 includes a communication module adapted to communicate with user device 110, instance determination device 142, and/or image processing server 150. The communication module may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. The communication module may communicate with user device 110 and/or instance determination device 142 using short range communications, such as Bluetooth Low Energy, LTE Direct, radio frequency, infrared, Bluetooth, and near field communications.

Image processing server 150 may be maintained, for example, by an online service provider, which may provide image processing services and interactive scene construction to user 102. In this regard, image processing server 150 includes one or more processing applications which may be configured to interact with user device 110, wireless beacons 146, and/or venue 140 to facilitate the generation of an interactive scene. In one example, image processing server 150 may be provided by STUBHUB®, Inc. of San Francisco, Calif., USA. However, in other embodiments, image processing server 150 may be maintained by or include an image, photograph, social networking, or other server that may provide image processing and hosting services to user 102 and/or venue 140. Moreover, in various embodiments, one or more of the applications, processes, and/or features discussed below in reference to image processing server 150 may be included in venue 140, and vice versa.

Image processing server 150 of FIG. 1 includes an image processing application 152, other applications 154, a database 156, and a network interface component 158. Image processing application 152 and other applications 154 may correspond to processes, procedures, and/or applications executable by a hardware processor, for example, a software program. In other embodiments, image processing server 150 may include additional or different software as required, such as a check-in application as discussed in reference to venue 140, where those features are instead provided by image processing server 150.

Image processing application 152 may be configured to receive information from and/or transmit information to user device 110 and/or instance determination device 142 for processing and generation of an interactive scene. Image processing application 152 may include one or more applications to process image data from user device 110 and/or instance determination device 142 by receiving the image data of an instance during an event hosted at venue 140. Image data may be captured after an instance during an event occurs. The image data may correspond to one or a plurality of images captured at the same time (e.g., through synchronized image capturing, as previously discussed). The same time may include images captured at approximately the same moment or within a time range, such as less than approximately 5 seconds, 4 seconds, or less. Thus, synchronized image data may include images of an instance captured within a time frame established in the request/command. Such a time frame may correspond to an issued time (e.g., 3:50:55 PM) or to a countdown timer (e.g., a 10 second timer). Thus, image processing application 152 may enable capture of media within the time frame occurring surrounding the issued time or countdown timer. Once the images are captured, either by user device 110, another device, and/or instance determination device 142, the images may be uploaded for processing by image processing server 150.

Image processing application 152 may process the image data by associating the image data with the uploading party and allowing users (including user 102) to view the image data. The image data may be collected to correspond to the same instance or event that was captured in the image data. Thus, users may be enabled to view image data for a variety of perspectives and audience members of the instance in the event. The image data may also be associated with a user account for the uploading user so that the uploading user may view the image data through accessing the user account.

In various embodiments, image processing application 152 may further generate an interactive scene using the image data. An interactive scene may correspond to a scene of the instance captured by the plurality of images in the image data during the event. The interactive scene may enable user 102 to browse, scroll, navigate, pan, and/or rotate views of the instance using the image data. Thus, user 102 may interact with the image data to view the instance through the synchronized images. Image processing application 152 has generated the interactive scene, image processing application 152 may allow user 102 to access the interactive scene or may transmit the interactive scene to user device 110 for viewing by user 102.

In various embodiments, image processing server 150 includes other applications 154 as may be desired in particular embodiments to provide features to image processing server 150. For example, other applications 154 may include security applications for implementing server-side security features, programmatic server applications for interfacing with appropriate application programming interfaces (APIs) over network 160, or other types of applications. Other applications 154 may contain software programs, executable by a processor, including a graphical user interface (GUI), configured to provide an interface to a user.

Additionally, image processing server 150 includes database 156. As previously discussed, user 102 and/or merchant 104 may establish one or more user accounts with image processing server 150. User accounts in database 156 may include user info/illation, such as name, address, birthdate, payment/funding information, and/or other desired user data, as well as image data from images captured by user device 110 and/or instance determination device 142. User accounts in database 156 may also be associated with interactive scenes constructed from those images, User 102 may link to their respective user accounts through an identifier. Thus, when the identifier is transmitted to image processing server 150, a user account belonging to user 102 may be found. Once a user account is found, image data and interactive scenes associated with the user account may be retrieved for user 102. In other embodiments, user 102 and/or merchant 104 may not have previously established an account and may provide other identifiers or information, as previously discussed, to find and retrieve image data and interactive scenes.

In various embodiments, image processing server 150 includes at least one network interface component 158 adapted to communicate user device 110, instance determination device 142, and/or wireless beacons 146 over network 160, In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
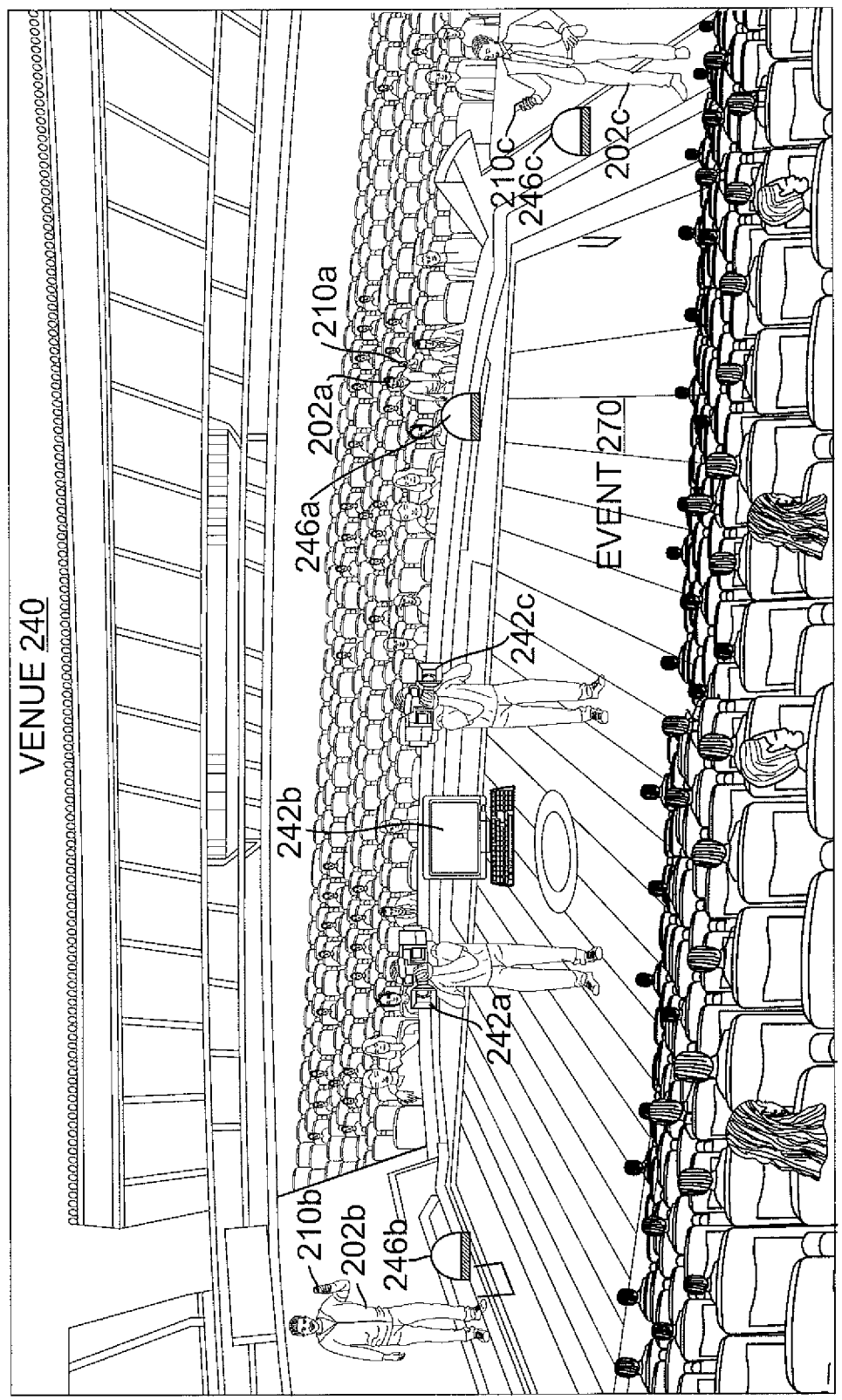
FIG. 2 is an exemplary environment including a plurality of users capturing synchronized media of an instance during an event for use creating an interactive scene, according to an embodiment.

FIG. 2 is an exemplary environment including a plurality of users capturing synchronized media of an instance during an event for use creating an interactive scene, according to an embodiment. Environment 200 of FIG. 2 includes a user 202a operating a user device 210a, a user 202b operating a user device 210b, and a user 202c operating a user device 210c all corresponding generally to user 102 operating user device 110 of FIG. 1. Environment 200 further includes a wireless beacon 246a, a wireless beacon 246b, and a wireless beacon 246c all corresponding generally to wireless beacons 146 of FIG. 1. Moreover, a venue 240, corresponding generally to venue 140 of FIG. 1, includes an instance determination device 242a, an instance determination device 242b, and an instance determination device 242c all corresponding generally to instance determination device 142 of FIG. 1.

Environment 200 includes venue 240 hosting an event 270 viewed by user 202a, 202b, and 202c. As previously discussed, event 270 may correspond to a concert sports game, exhibit, public gathering, speech, etc. Thus, user 202a, 202b, and 202c are viewing event 270 at different locations in venue 240. For example, event 270 may correspond to a football game where user 202a views the football game from one set of seats, user 202b another set of seats, and user 202c a third set of seats. Additionally, venue 240 includes instance determination devices 242a, 242b, and 242c set up to monitor event 270 and determine if and when an instance during event 270 may occur. For example, instance determination devices 242a, 242b, and 242c may correspond to a plurality of optical cameras and microphones with backend processing equipment that may capture event 270 and determine if an instance during event 270 occurs or is going to occur. Instance determination devices 242a, 242b, and 242c may do so through audio, video, or audiovisual input of event 270, input from a producer, administrator, or other entity monitoring event 270, or through other information, as previously discussed. Once instance determination devices 242a, 242b, and 242c determine an instance is occurring or is going to occur, instance determination devices 242a, 242b, and 242c may generate a request/command to capture an image of the instance that may be distributed to user devices 210a, 210b, and 210c using wireless beacons 246a, 246b, and 246c. The request/command may synchronize user device 210a, 210b, and 210c to capture an image of the instance simultaneously using their respective device cameras.

Thus, wireless beacons 246a, 246b, and 246c may previously establish a connection with user devices 210a, 210b, and 210c, respectively, when user device 210a, 210b, and 210c, respectively, come in to range of the wireless beacons. Using the check-in information, or other information provided by user device 210a, 210b, and 210c to establish the connection, wireless beacons 246a, 246b, and 246c may distribute the request/command generated by instance determination devices 242a, 242b, and 242c. Since the request/command may synchronize user device 210a, 210b, and 210c to capture images of the instance simultaneously, user devices 210a, 210b, and 210c may process the request/command and utilize device cameras to capture synchronized images of the instance. Once the images are captured, the images may be uploaded to an image processing server on approval by users 202a, 202b, and 202c, as previously discussed.

Figure 3:
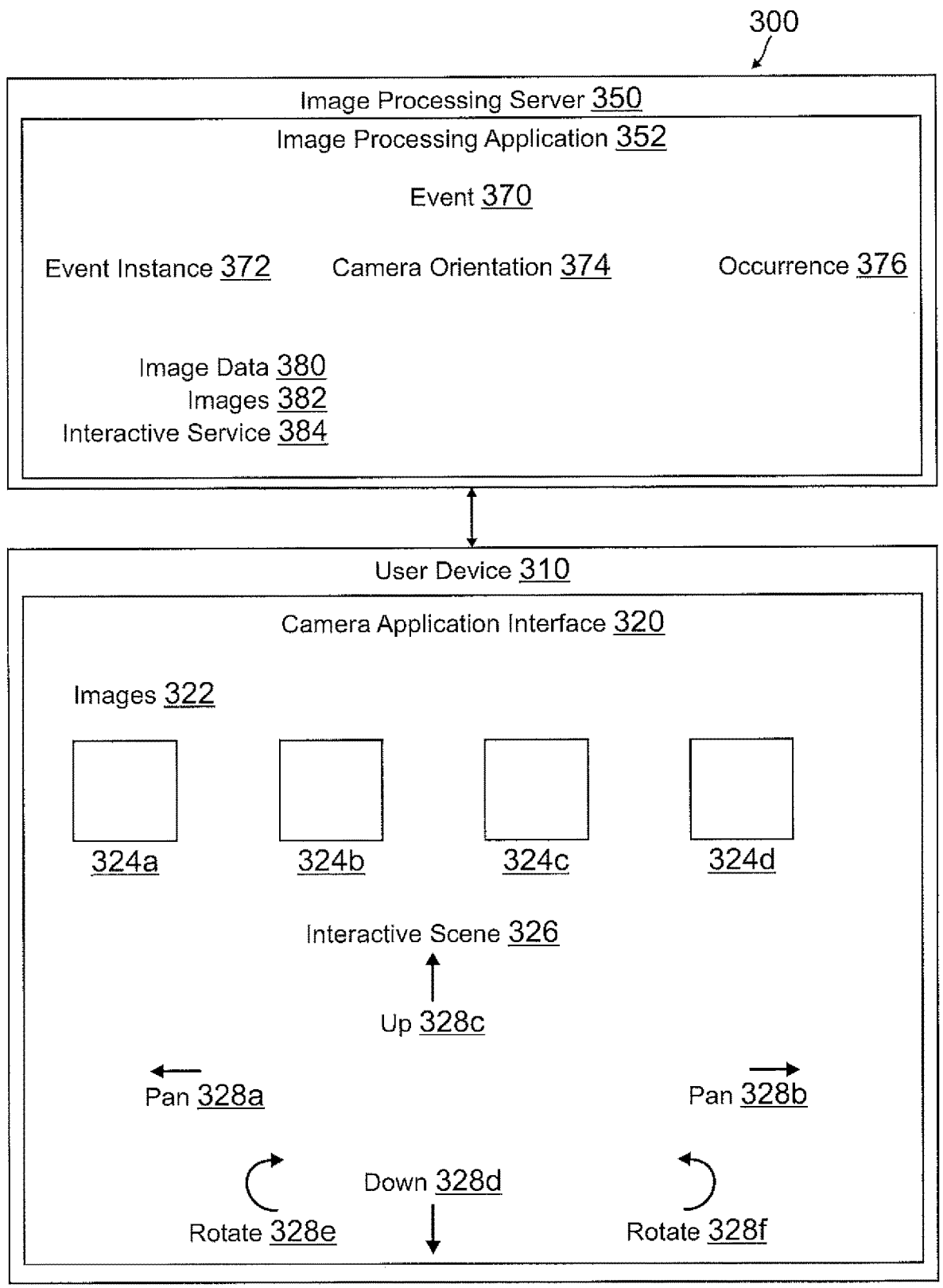
FIG. 3 is an exemplary system environment including a server preparing an interactive scene from synchronized media submitted by user devices, according to an embodiment.

FIG. 3 is an exemplary system environment including a server preparing an interactive scene from synchronized media submitted by user devices, according to an embodiment. Environment 300 includes a user device 310 and an image processing server 350 corresponding generally to user device 110 and image processing server 150, respectively, of FIG. 1.

Image processing server 350 may receive the image data uploaded from user devices (e.g., user device 310) after the image data is captured of an instance during an event. Image processing server 350 executes an image processing application 352 corresponding generally to the processes and procedures discussed in reference to image processing application 152 of FIG. 1. Image processing application 352 utilizes event 370 data having an event instance 372, a camera orientation 374, and an occurrence 376 with image data 380 having images 382 and interactive scene 384. Event 370 data may correspond to data received from a venue's instance determination device(s) that may include the information for instances that occurred during the event and information necessary to construct an interactive scene from image data captured of the instance. Thus, event 370 data includes event instance 372 having data about the instance that occurred during the event. For example, event instance 372 may include an identifier and data for when a play occurred during a sports game, a song or artist that performed during a concert, or other instance that occurred during an event. Coupled with event instance 372 data is camera orientation 374 data having information about how and where a camera should be oriented to capture the image. Camera orientation 374 may be utilized to build an interactive scene and remove image data that does not correspond to camera orientation, for example, if image data is received but aimed at the audience of the event and not the instance in the event. Furthermore, occurrence 376 data includes information of when event instance 372 occurred, where event instance 372 occurred, and other information to insure that all of the image data collected for event instance 372 is synchronized.

Image processing application 352 may utilize event 370 data with image data 380. Image data 380 includes images 382 that are uploaded to image processing server 350 by user devices. Images 382 may correspond to the image data for an event, and may be filtered using event 370 data to select image data for only event instance 372. Once the image data for event instance 382 is gathered from images 382, image processing application 352 may associate and/or process the image data for event instance 382 into an interactive scene 384 for event instance 372. As previously discussed, interactive scene 384 may display all the images captured simultaneously for event instance 372 and may be constructed to allow a user to browse, scroll, pan, rotate, etc. the images of the scene.

Once interactive scene 384 is constructed, user device 310 may access or receive the interactive scene for display to a user (not shown) of user device 310. User device 310 displays a camera application interface 320 corresponding generally to the processes and features described in reference to camera application 120 of FIG. 1. Camera application interface 320 may display images 322, which may correspond to images, captured of interactive scene 384. Thus, images 322 include an image 324a, an image 324b, an image 324c, and an image 324d. Images 322 may correspond to images of event instance 372 from interactive scene 384 that may be taken from different devices when the images for event instance 372 was captured. Thus, the user is able to view images 322 of event instance 372 from a multitude of angles and perspectives. Further camera application interface 320 displays an interactive scene 326 of event instance 372 that is constructed to enable the user to navigate through images 322. Interactive scene 326 includes navigation tools to enable the user to move seamlessly through the scene and the different perspectives. Thus, selection of pan 328a and pan 328b may enable the user to move a camera perspective of event instance 372 left and right, respectively. Furthermore, selection of up 328c and down 328d may enable the user to move the camera perspective up and down, respectively. The user is also enabled to rotate the scene to view the scene from different angles and sides using rotate 328e and rotate 328f. Additional navigation tools may also be included in further embodiments.

Figure 4:
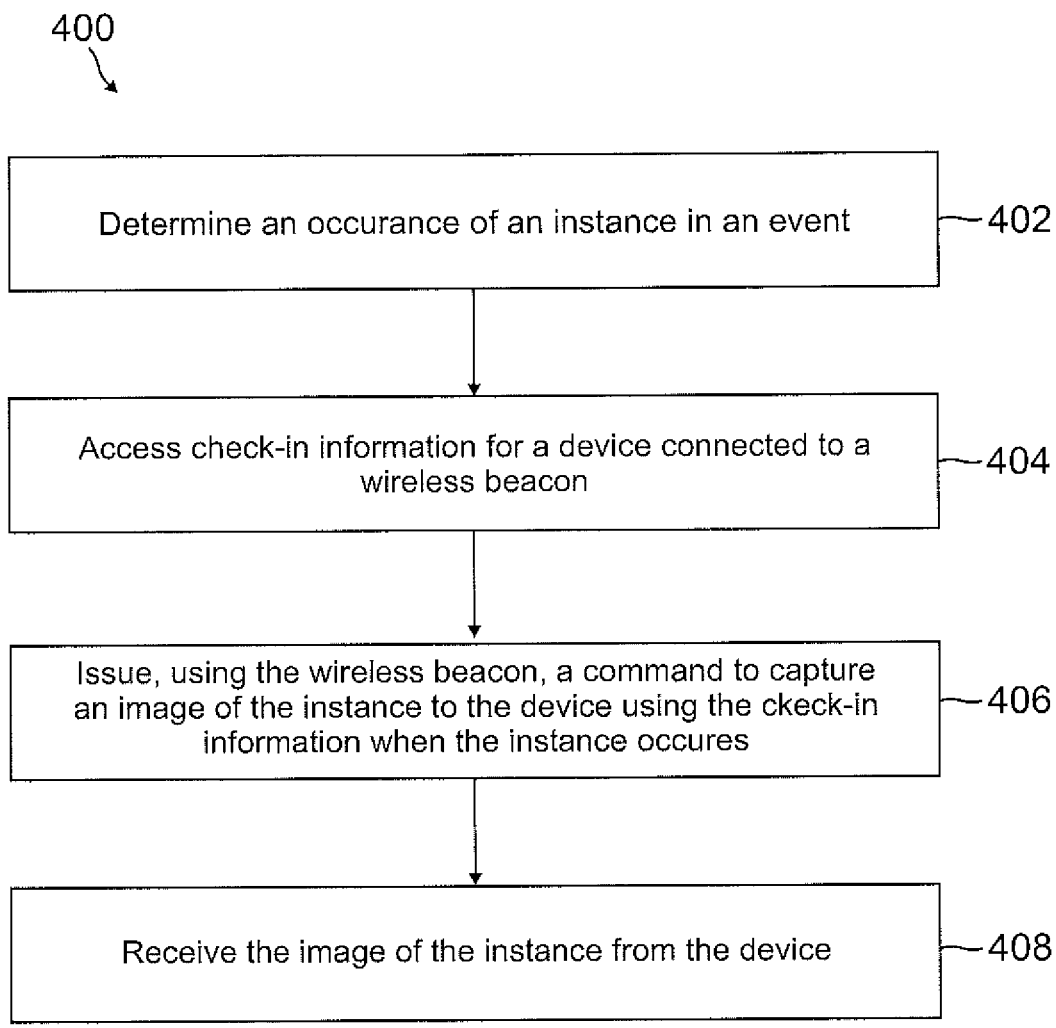
FIG. 4 is a flowchart of an exemplary process for synchronized media capturing for an interactive scene, according to an embodiment.

FIG. 4 is a flowchart of an exemplary process for synchronized media capturing for an interactive scene, according to an embodiment. Note that one or more steps, processes, and methods described herein may be omitted, performed in a different sequence, or combined as desired or appropriate.

At step 402, an occurrence of an instance during an event is determined. For example, it may be determined that an instance is or will occur during the event. Additionally, it may be desirable to capture an image of the instance, which may be an action during the event. The instance may comprise a play in a sports game, a song or performance in a concert, or an action in a stage performance. For example, during a gold tournament, an instance may correspond to the moment a golf ball is struck. The moment the golf ball is struck may be determined using microphone to pick up the sound of the contact between the golf club and the golf ball. Thus, it may be determined that an instance has occurred using the microphones and/or video cameras monitoring the players golf swing. Other instance may be determined using a schedule for upcoming artists in a concert, microphones detecting a note or series of notes of a song (e.g., an audio sampling of the song), facial or other recognition and image processing, etc.

Check-in information for a device connected to a wireless beacon is accessed, at step 404. The device and the wireless beacon may connect using one of near field communication, radio communication, infrared communication, Bluetooth communication, Bluetooth Low Energy (BLE) communication, and LTE Direct communication. The device may also correspond to a plurality of devices, such as a plurality of mobile devices having a plurality of device cameras used to capture an image of the instance. Additionally, the wireless beacon may correspond to a plurality of wireless beacons set up throughout a venue. Thus, a plurality of connections between the plurality of devices and the plurality of wireless beacons may also be used.

At step 406, a command to capture an image of the instance is issued to the device using the wireless beacon and the check-in information when the instance occurs. The command may also correspond to a request to capture a future image of an upcoming instance. The request/command may prevent the device from capturing images prior to the occurrence of the instance. If the instance does not occur, the devices may be allowed to again begin capturing images through a timer, countdown, instruction, etc. The request/command may also include a directional instruction for aiming the device to capture the image.

If the wireless beacon issues a request to capture a future image of an instance that will occur, an occurrence of the instance may be detected and a command to capture the image may be communicated to the device based on detecting the occurrence of the instance. In other embodiments, a timer or countdown may be used to trigger image capturing on the occurrence of an instance. Additionally, it may be desired to capture a second image of a second occurrence. Thus, another request/command may be communicated to the device to capture the second image. Once the image is captured, the image may be displayed to the user for the user to decide to upload to an image processing entity or to delete.

If the user chooses to upload the image, the image and/or image data may be received, at step 408. The image and/or image data may be utilized with additional images and/or image data to construct an interactive scene of the instance. The interactive scene may be communicated to the device for the user to view. Additionally, the user may navigate the interactive scene using the device.

Figure 5:
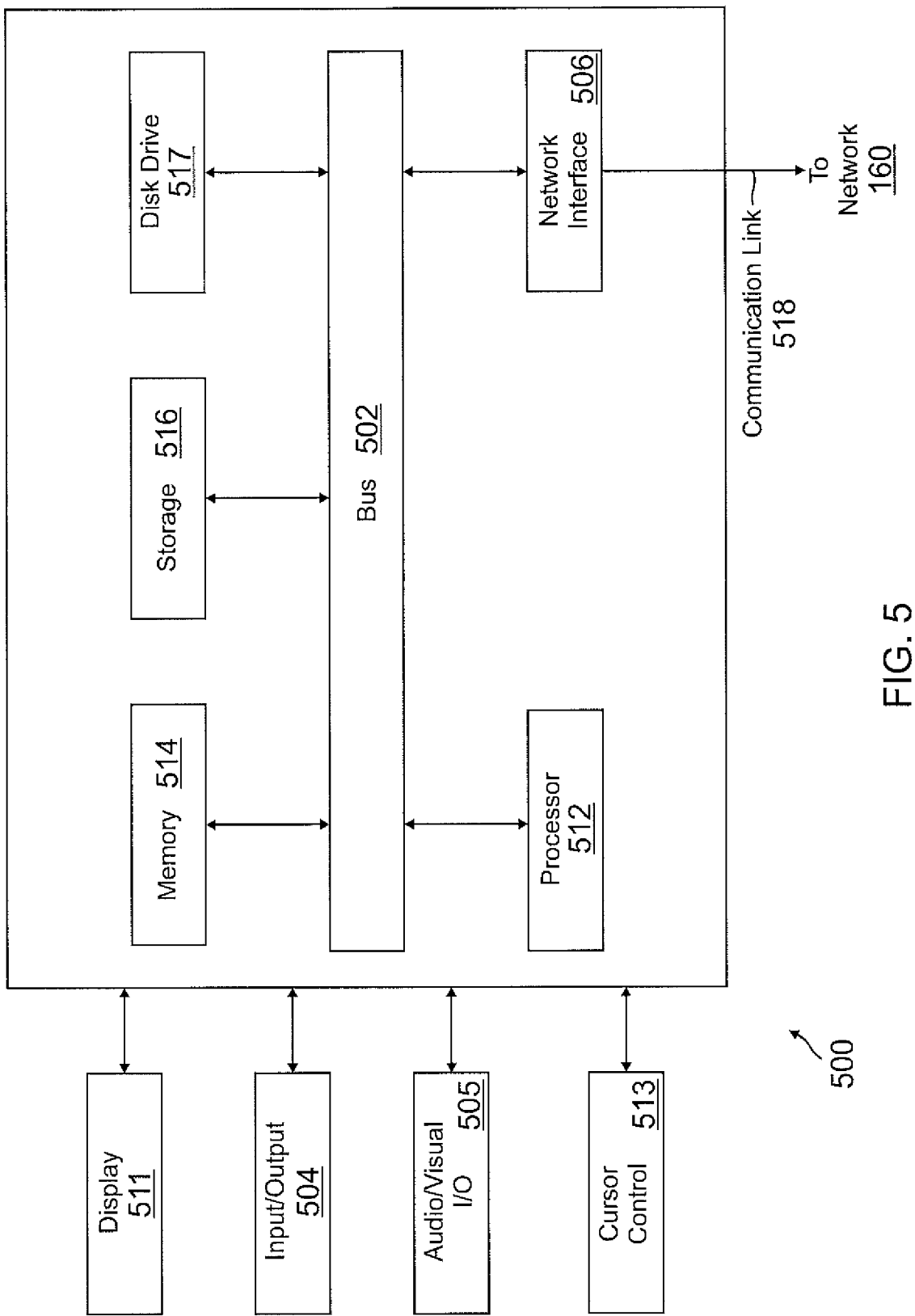
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio, A transceiver or network interface 506 transmits and receives signals between computer system 500 and other devices, such as another user device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514, Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium, In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   determining, using one or more processors, an occurrence of an instance at an event during a first time frame;
   determining a first orientation of a first device and a second orientation of a second device;
   sending, to the first device and the second device, a request to capture the instance upcoming at the event at the first orientation and the second orientation during the first time frame;
   based on the request, receiving synchronized captured media of the instance at the occurrence from the first device based on the first orientation and from the second device based on the second orientation;
   generating an interactive composite scene from the first and second synchronized captured media received from the first and second devices;
   determining that the synchronized captured media of the instance comprises image data captured in a region outside of the first and second orientation of the first and second devices;
   in response to determining that the synchronized captured media of the instance comprises image data captured in the region outside of the first and second orientation, removing the image data from the interactive composite scene; and
   transmitting the interactive composite scene to at least one of the first device, the second device, or a combination thereof.

2. The method of claim 1, further comprising:
   receiving, from a third device, synchronized captured media of the instance at the occurrence of the instance based on sending the request,
   wherein generating the interactive composite scene further comprises generating the interactive composite scene from the synchronized captured media received from the third device, and
   wherein transmitting the interactive composite scene further comprises transmitted t interactive composite scene to the third device.

3. The method of claim 1, wherein receiving from the first and second devices further comprises:

receiving the synchronized captured media from the first device and the synchronized captured media from the second device at an image processing application on an image processing server.

4. The method of claim 1, wherein generating the interactive composite scene further comprises:
generating the interactive composite scene such that a user interacting with the interactive composite scene is enabled to interact with the interactive composite scene on the first device or the second device.

5. The method of claim 4, further comprising:
generating the interactive composite scene such that the user interacting with the interactive composite scene is enabled to perform at least one of: browse through the media using the first device, pan within the interactive composite scene, rotate views of the instance, zoom on the interactive composite scene, zoom out on the interactive composite scene, or a combination thereof.

6. The method of claim 4, wherein generating the interactive composite scene further comprises:
generating the interactive composite scene such that the interactive composite scene includes views of the instance from multiple angles, the multiple angles received from the first and second devices.

7. The method of claim 1, wherein the request further directs the first and second devices to capture a single type of media of the instance.

8. The method of claim 1, wherein the request further directs the first and second devices to capture multiple types of media of the instance.

9. The method of claim 1, wherein the request further directs the first and second devices to capture media of the instance within a pre-determined time frame around the occurrence of the instance.

10. The method of claim 9, wherein the request to capture the synchronized media of the instance upcoming at the event within the pre-determined time frame further indicates to capture media at a specific time.

11. The method of claim 9, wherein the request to capture the synchronized media of the instance upcoming at the event within the pre-determined time frame further indicates to capture media beginning at a first time associated with a countdown timer and ending at an expiration of the countdown timer.

12. The method of claim 1, further comprising:
discarding media not captured using a pre-determined orientation before generating the interactive composite scene.

13. The method of claim 1, wherein receiving, from the first and second devices comprises:
receiving at least one of a still image, an audio recording, a video recording, an audio video recording, or a combination thereof.

14. A system, comprising:
one or more processors; and
memory including instructions that, when executed by the one or more processors, cause the system to perform operations comprising:
determining, using one or more processors, an occurrence of an instance at an event during a first time frame;
determining a first orientation of a first device and a second orientation of a second device;
sending, to the first device and the second device, a request to capture the instance upcoming at the event at the first orientation and the second orientation during the first time frame;
based on the request, receiving synchronized captured media of the instance at the occurrence from the first device based on the first orientation and from the second device based on the second orientation;
generating an interactive composite scene from the first and second synchronized captured media received from the first and second devices;
determining that the synchronized captured media of the instance comprises image data captured in a region outside of the first and second orientation of the first and second devices;
in response to determining that the synchronized captured media of the instance comprises image data captured in the region outside of the first and second orientation, removing the image data from the interactive composite scene; and
transmitting the interactive composite scene to at least one of the first device, the second device, or a combination thereof.

15. The system of claim 14, wherein the operations further comprise:
receiving, from a third device, synchronized media of the instance at the occurrence of the instance based on sending the request,
generating the interactive composite scene from the synchronized media received from the third device, and
transmitting the interactive composite scene to the third device.

16. The system of claim 14, wherein operations further comprise:
generating the interactive composite scene such that a user interacting with the interactive composite scene is enabled to interact with the interactive composite scene on the first device or the second device.

17. The system of claim 16, wherein the operations further comprise:
generating the interactive composite scene such that the user interacting with the interactive composite scene is enabled to perform at least one of: browse through the media using the first device, pan within the interactive composite scene, rotate views of the instance, zoom on the interactive composite scene, zoom out on the interactive composite scene, or a combination thereof.

18. The system of claim 14, wherein the request further directs the first and second devices to capture media of the instance within a pre-determined time frame around the occurrence of the instance.

19. The system of claim 14, wherein operations further comprise:
discarding media not captured using the pre-determined orientation.

20. One or more non-transitory computer-readable media storing one or more programs that are configured, when executed, to cause one or more machines to execute operations comprising:
determining, using one or more processors, an occurrence of an instance at an event during a first time frame;
determining a first orientation of a first device and a second orientation of a second device;
sending, to the first device and the second device, a request to capture the instance upcoming at the event at the first orientation and the second orientation during the first time frame;
based on the request, receiving synchronized captured media of the instance at the occurrence from the first device based on the first orientation and from the second device based on the second orientation;

generating an interactive composite scene from the first and second synchronized captured media received from the first and second devices;

determining that the synchronized captured media of the instance comprises image data captured in a region outside of the first and second orientation of the first and second devices;

in response to determining that the synchronized captured media of the instance comprises image data captured in the region outside of the first and second orientation, removing the image data from the interactive composite scene; and transmitting the interactive composite scene to at least one of the first device, the second device, or a combination thereof.

* * * * *